United States Patent
Cuan et al.

(10) Patent No.: US 12,192,160 B2
(45) Date of Patent: Jan. 7, 2025

(54) COMPUTER-BASED SYSTEMS PROGRAMMED FOR AUTOMATIC ADAPTIVE CONTENT-BASED PROCESSING OF ELECTRONIC MESSAGES AND METHODS OF USE THEREOF

(71) Applicant: Capital One Services, LLC, McLean, VA (US)

(72) Inventors: Lukiih Cuan, Washington, DC (US); Latika Gulati, Vienna, VA (US); Cruz Vargas, Ocean Springs, MS (US); Lea Cody, Washington, DC (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 358 days.

(21) Appl. No.: 17/580,443

(22) Filed: Jan. 20, 2022

(65) Prior Publication Data
US 2023/0231822 A1    Jul. 20, 2023

(51) Int. Cl.
*H04L 51/212*    (2022.01)
*G06F 40/40*    (2020.01)
*H04L 67/306*    (2022.01)

(52) U.S. Cl.
CPC ............ *H04L 51/212* (2022.05); *G06F 40/40* (2020.01); *H04L 67/306* (2013.01)

(58) Field of Classification Search
CPC ..... H04L 51/212; H04L 67/306; G06F 40/40; G06F 40/216; G06F 40/279; G06F 40/30
See application file for complete search history.

(56) References Cited

U.S. PATENT DOCUMENTS

| | | | |
|---|---|---|---|
| 8,631,018 B2 | 1/2014 | Ramer et al. | |
| 10,516,638 B2 | 12/2019 | Syrowitz et al. | |
| 2006/0178918 A1* | 8/2006 | Mikurak | G06Q 10/06 705/7.31 |
| 2007/0053513 A1* | 3/2007 | Hoffberg | G06V 40/103 380/201 |
| 2007/0106555 A1* | 5/2007 | Benson | G06Q 30/02 705/400 |
| 2008/0162206 A1* | 7/2008 | Mak | G06Q 30/0255 705/14.53 |
| 2013/0073473 A1* | 3/2013 | Heath | G06Q 30/0241 705/319 |
| 2014/0195398 A1 | 7/2014 | Rose et al. | |
| 2020/0349610 A1* | 11/2020 | Publicover | H04L 67/306 |

(Continued)

*Primary Examiner* — Michael N Opsasnick
(74) *Attorney, Agent, or Firm* — Greenberg Traurig, LLP

(57) ABSTRACT

Systems and methods of the present disclosure enable improved content filtering by determining a profile state of the user profile based at least in part on at least one attribute of the user profile and determining a user profile criterion associated with the user profile based on the profile state including a threshold value to trigger a filter parameter associated with the profile objective, where the filter parameter comprises a content type to be processed so as to facilitate achieving the profile objective. The filter parameter is determined based on the profile state surpassing the user profile criterion. A content recognition model is used to identify a message content of each message. An electronic message that matches the content type is identified and filtered at the electronic messaging client to prevent the content from being presented.

20 Claims, 7 Drawing Sheets

(56) References Cited

U.S. PATENT DOCUMENTS

2021/0157872 A1* 5/2021 David .................. G06F 40/279
2021/0319099 A1* 10/2021 Gaddam ............. H04L 63/1408
2023/0126052 A1* 4/2023 Mohajer ............ G06Q 30/0251
  705/14.49

* cited by examiner

COMPUTER-BASED SYSTEMS PROGRAMMED FOR AUTOMATIC ADAPTIVE CONTENT-BASED PROCESSING OF ELECTRONIC MESSAGES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems and platforms configured for automatic adaptive content-based processing of electronic messages and methods of use thereof.

BACKGROUND OF TECHNOLOGY

Typically, electronic message processing (e.g., filtering) is based on predefined criteria lists that filter out certain messages from delivery to a client, such as spam filters.

SUMMARY OF DESCRIBED SUBJECT MATTER

In some embodiments, the present disclosure provides an exemplary technically improved computer-based method that includes at least the following steps of accessing, by at least one processor, a user profile associated with a user of an electronic messaging client; determining, by the at least one processor, a profile state of the user profile based at least in part on at least one attribute of the user profile; wherein the profile state comprises: at least one metric associated with the profile and at least one profile objective associated with the at least one metric; determining, by the at least one processor, at least one user profile criterion associated with the user profile based at least in part on the at least one metric and the at least one profile objective; wherein at least one criterion comprises at least one threshold value to trigger at least one filter parameter associated with the at least one profile objective; wherein the at least one filter parameter comprises at least one content type associated to be processed so as to facilitate achieving the at least one profile objective; determining, by the at least one processor, the at least one filter parameter based at least in part on the profile state surpassing the at least one user profile criterion; utilizing, by the at least one processor, at least one content recognition model to identify a message content type of each message in a set of electronic messages received by the electronic messaging client based at least in part on content in each message in the set of electronic messages; determining, by the at least one processor, at least one electronic message of the set of electronic messages received by the electronic messaging client that matches the at least one content type of the at least one filter parameter based at least in part on the message content type of each message in a set of electronic messages; and filtering, by the at least one processor, the at least one electronic message from the electronic messages at the electronic messaging client to prevent the at least one content from being presented by the electronic messaging client so as to facilitate achieving the at least one profile objective.

In some embodiments, the present disclosure provides an exemplary technically improved computer-based system that includes at least the following components of at least one processor configured to execute software instructions to perform steps. The steps may include: access a user profile associated with a user of an electronic messaging client; determine a profile state of the user profile based at least in part on at least one attribute of the user profile; determine at least one user profile criterion associated with the user profile; wherein at least one criterion comprises at least one threshold value to trigger at least one filter parameter; wherein the at least one filter parameter comprises at least one content type associated with the at least one user profile criterion; determine the at least one filter parameter based at least in part on the profile state surpassing the at least one user profile criterion; utilize at least one content recognition model to identify at least one electronic message of a set of electronic messages received by the electronic messaging client that matches the at least one content type of the at least one filter parameter based at least in part on message contents of the at least one electronic message; and filter the at least one electronic message from the electronic messages at the electronic messaging client to prevent the at least one content from being presented by the electronic messaging client.

Embodiments of the methods and/or systems of the present disclosure further include wherein the profile state comprises a financial account balance; and wherein the at least one filter parameter comprises at least one restriction of the at least one content type of offers for products, services or both.

Embodiments of the methods and/or systems of the present disclosure further include: receiving, by the at least one processor, at least one savings goal selected by user selection; identifying, by the at least one processor, the at least one user profile criterion based at least in part on the at least one savings goal; and determining, by the at least one processor, the at least one filter parameter based at least in part on the at least one user profile criterion.

Embodiments of the methods and/or systems of the present disclosure further include wherein the at least one threshold value comprises at least one of: a savings goal, a balance level, a credit limit, a transaction volume, a transaction frequency, or a budget.

Embodiments of the methods and/or systems of the present disclosure further include: receiving, by the at least one processor, a user profile activity history comprising at least one electronic activity performed with the user profile; utilizing, by the at least one processor, at least one propensity model trained to predict a propensity of the user to engage with the at least one electronic message based at least in part on the at least one content type and the user profile activity history; and filtering, by the at least one processor, the at least one electronic message from the electronic messages at the electronic messaging client to prevent the at least one content from being presented by the electronic messaging client based at least in part on the propensity of the user to engage with the at least one electronic message exceeding a threshold propensity value.

Embodiments of the methods and/or systems of the present disclosure further include wherein the at least one electronic activity comprises payment transactions.

Embodiments of the methods and/or systems of the present disclosure further include generating, by the at least one processor, at least one content overlay to obscure the at least one content of the at least one electronic message to filter the at least one electronic message.

Embodiments of the methods and/or systems of the present disclosure further include: identifying, by the at least one processor, a plurality of selectable content associated with the at least one content within the at least one electronic message based on a predefined selectable content format inserted by a sender; and determining, by the at least one processor, at least one selected content of the plurality of selectable content for presentation by the electronic messaging client based at least in part on the at least one filter parameter to filter the at least one content.

Embodiments of the methods and/or systems of the present disclosure further include blocking, by the at least one processor, the at least one electronic message from presentation by the electronic messaging client to filter the at least one electronic message.

Embodiments of the methods and/or systems of the present disclosure further include wherein the at least one content recognition model comprises at least one natural language processing model to recognize the at least one content based at least in part on text within the at least one electronic message.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
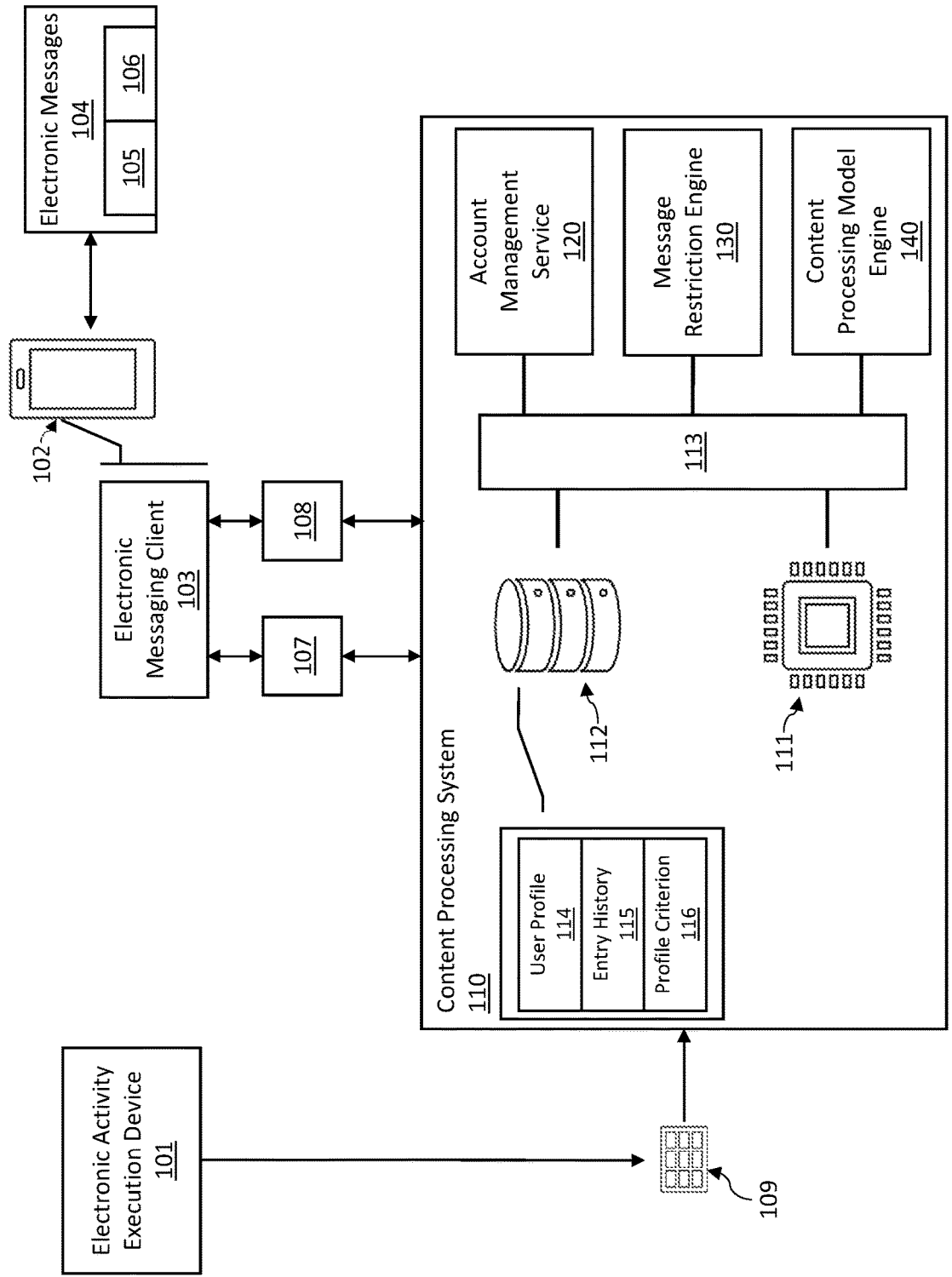
FIGS. 1-7 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of electronic message processing for permanent and/or temporary electronic message management, such as through filtering, blocking, modifying, delaying, etc., based on user profile criteria and/or states at a particular time for automated, dynamic and adaptive processing at network-connected devices and applications. The following embodiments provide technical solutions and technical improvements that overcome technical problems, drawbacks and/or deficiencies in the technical fields involving message filtering limited to whether messages are spam and/or malicious. As explained in more detail, below, technical solutions and technical improvements herein include aspects of improved electronic message processing on network-connected devices and applications that processes non-spam and non-malicious electronic messages by real-time adjustment of one or more content processing parameter(s), such as one or more filter parameter(s), based on user profile states determined from a user's electronic activities. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of a content processing system for management of electronic messages and/or electronic message content of an electronic messaging client in accordance with one or more embodiments of the present disclosure.

In some embodiments, a user may employ a user device 102 for sending and receiving electronic messages via an electronic messaging client 103. In some embodiments, the electronic messaging client 103 may include any suitable software and/or hardware for implementing messaging services via messaging protocols, such as, e.g., instant messaging (e.g., extensible messaging and presence protocol (XMPP), Pidgin, WhatsApp®, Facebook Messenger, WeChat®, Telegram, Viber®, Signal, Line, Snapchat®, Skype®, Slack®, iMessage®, etc.), text messaging (e.g., simple messaging service (SMS) and/or multimedia messaging service (MMS) and/or rich communication service (RCS), etc.), email (e.g., simple mail transfer protocol (SMTP), Exchange ActiveSync®, Internet Message Access Protocol (IMAP), Post Office Protocol (POP3), etc.), social media posts, shared documents (e.g., using a suitable filing sharing protocol) or any other suitable messaging protocol for use by an electronic messaging client or any combination thereof.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, the user device 102 may utilize an input component, such as a physical or virtual keyboard, to interact with a software application associated with the electronic messaging client 103 running on the user device 102. In some embodiments, the user device 102 may include, e.g., at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the electronic messages 104 may each include message data 105 and content data 106 representing message related information. In some embodiments, the message data 105 may include source data associated with a source of the message, destination data associated with a destination of each electronic message 104, a date, a time, a data size, among other related data and metadata for each electronic message 104.

In some embodiments, the message data 105 may include the source data regarding a sender and/or sending computing device. For example, source data may include, e.g., a computing device type (e.g., smartphone, tablet, laptop computer, smartwatch, or other computing device), sender data such as a sender identifier (e.g., email address, host server address, user account, name, company or organization name, etc.), among other data and combinations thereof.

In some embodiments, the message data 105 may include the destination data regarding a recipient and/or receiving computing device such as the user device 102. For example, destination data may include, e.g., a computing device type (e.g., smartphone, tablet, laptop computer, smartwatch, or other computing device), recipient data such as a recipient identifier (e.g., email address, host server address, user account, name, company or organization name, etc.), among other data and combinations thereof.

In some embodiments, the content data 106 may include data and metadata representing the content of each electronic message 104. In some embodiments, the electronic messages 104 may include text content, images (e.g., JPG, EXIF, TIFF, BMP, WebP, GIF, HEIF, PNG, etc.), formatting of text and/or images, interactive media (e.g., videos formatted as, e.g., MP4, MOV, WMV, FLY, AVI, AVCHD, WebM, MKV, VP9, etc.), Javascript or other software script elements, Emoji, hyperlinks, attached documents (such as documents provided in a formation including, e.g., PDF, DOC, DOCX, XLS, XLSX, PPT, PPTX, ODF, HTML/CSS, XML, etc.) among other message contents or any combination thereof. In some embodiments, the content data 106 may include data representing the content as well as formatting, layout, size, or other content metadata or any combination thereof.

In some embodiments, the electronic messaging client 103 of the user device 102 may be configured to communicate with a content processing system 100 for automated and adaptive filtering, managing, blocking, modifying, delaying, etc. of the electronic messages 104. In some embodiments, the electronic messaging client 103 may, e.g., access a service provided by an exemplary content processing system 110 via a plug-in or extension, such as cloud service or microservice to manage the electronic messages 104. Alternatively, or additionally, the content processing system 110 may be configured via the electronic messaging client 103 to intercept the electronic messages 104 for filtering prior to delivery to the user device 102.

In some embodiments, the electronic messaging client 103 may interact with the content processing system 110 using one or more suitable local and/or network communication protocols, such as, e.g., a messaging protocol, a networking protocol, one or more application programming interfaces (APIs), or other suitable technique for communicating between computing systems or any combination thereof. For example, the electronic messaging client 103 may interact with the content processing system 110 over a network including the Internet using the HyperText Transport Protocol (HTTP) to communicate one or more API requests to cause the content processing system 110 to perform the filtering of the electronic messages 104. In another example, the content processing system 110 is connected to the user device 102 via a local network, such as, e.g., Ethernet, Local Area Network (LAN), wireless LAN (WLAN), WiFi, Bluetooth, or other suitable networking technology or any combination thereof, and communicate via API requests and/or database queries in a suitable database query language (e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages). In another example, the content processing system 110 may be local to the user device 102, such as, e.g., a software program installed on the user device 102 and configured to employ computing hardware of the user device 102 to perform the filtering for the electronic messaging client 103. In some embodiments, any suitable combination of local, networked, cloud, distributed or other computing architecture may be employed to filter electronic messages 104 for display via the electronic messaging client 103 on the user device 102.

In some embodiments, the content processing system 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the content processing system 110 may include storage 112, such as local hard-drive, solid-state drive, flash drive, database or other local storage, or remote storage such as a server, mainframe, database or cloud provided storage solution. In some embodiments, the storage 112 may include, e.g., stored user profiles associated with each user enrolled with the content processing system 110, electronic activity entry history for each user enrolled, and one or more profile criterion(ia) that establish a criterion and/or criteria for implementing content filters based on the user profile of each user enrolled, among other user-related data.

In some embodiments, the user profile 114 of a user associated with the user device 102 may include, e.g., user-related information including, e.g., a name, age, sex, gender, location, account or profile identifier, account or profile type, electronic messaging type (e.g., email, SMS, MMS, RCS, internet messaging, social media, etc.), statistical summaries of an entry history 115, among other information or any combination thereof.

In some embodiments, the entry history 115 may include a record of electronic activities 109 submitted to the content processing system 110 by one or more electronic activity execution device(s) 101. In some embodiments, a data entry in the entry history 115 for an electronic activity 109 may include, e.g., a user identifier associated with each data entry, a third-party entity identifier associated with each data entry, an activity type identifier, an activity value or activity quantity, a time data item, a location data item, a date data item, a device type or device identifier associated with the electronic activity execution device 101, an activity description, or other attributes representing characteristics of each data entry.

For example, in some embodiments, the electronic activity data entry may include a transaction-related activity, such as a transaction record (e.g., transaction authorization request, posted transaction, etc.). In such an example, the data items may include, e.g., a transaction value, a transaction type, an account identifier or a user identifier or both, a merchant identifier, a transaction authorization date, a transaction post date, a transaction location, an execution device 101 (e.g., point-of-sale device, Internet payment, etc.) among other transaction data and combinations thereof.

In some embodiments, the electronic activity execution device 101 may include any computing device from electronic activities 109 are performed or executed, such as, e.g., a terminal, personal computer or mobile computing device for performing Internet-based and application-based activities (e.g., account logins, account information changes, online purchases, instant message communications, social media posts, among others and combinations thereof).

In some embodiments, the electronic activity execution device 101 may include a physical terminal for performing electronic transactions, such as, e.g., a point-of-sale device, automated teller machine (ATM) or other device. As a result of a user executing electronic activities 109 via the electronic activity execution device 101, data entries may be produced for entry into the user's profile. For example, the electronic activity execution device 101 may produce an electronic activity data entry in the entry history 115.

In some embodiments, a profile criterion and/or criteria ("profile criterion/criteria") 116 may include predefined and/or user defined and/or automatically generated filtering criteria based on the user profile 114 and the entry history 115. To enable adaptive and dynamic content processing responsive to a user's circumstances, the profile criterion/criteria 116 may be defined to establish content processing parameter(s) (e.g., a filter parameter or filter parameters), such as message restrictions, sender restrictions, content restriction, etc. based on a profile state of the user profile 114. As electronic activities 109 are recorded in the entry history 115, the profile state may be updated in the user profile 114 to reflect the circumstances of the user. In some embodiments, the profile criterion/criteria 116 may include a correlation or mapping of profile state to content processing parameter(s). The content processing system 110 may employ the content processing parameter(s) in response to receiving a particular electronic message 107 from the electronic messaging client 103 to determine whether or not to filter the electronic message 107 by blocking the electronic message 107 and/or content thereof from being delivered.

In some embodiments, the content processing system 110 may implement computer engines for leveraging the user profile 114, entry history 115 and profile criterion/criteria 116 to establish one or more content processing parameter(s) and perform processing (e.g., filtering and/or one or more other management processes) of electronic messages based on the content processing parameter(s). In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to access the user profile 114 and entry history 115 in order to determine and/or extract the profile criterion/criteria 116, the content processing system 110 may include computer engines including, e.g., an account management service 120. In some embodiments, the account management service 120 may access the storage 112, e.g., via suitable database queries in a database query language as described above, to determine a profile state for the user according to user profile 114 data, entry history 115 and/or the profile criterion/criteria 116. In order to implement the account management service 120, the account management service 120 may include dedicated and/or shared software components, hardware components, or a combination thereof. For example, the account management service 120 may include a dedicated processor and storage. However, in some embodiments, the account management service 120 may share hardware resources, including the processor 111 and storage 112 of the content processing system 110 via, e.g., a bus 113.

In some embodiments, in response to the electronic message 107, the account management service 120 may access the user profile 114 and/or the entry history 115 to determine a profile state of the user associated with the electronic message 107. In some embodiments, the profile state may include, e.g., a user location as specified in the user profile 114, a user preference as specified in the user profile 114, or other profile attribute indicated in the user profile 114. In some embodiments, the profile state may include one or more metrics that quantify an associated electronic activity-related attribute based on the electronic activity data entries recorded in the entry history 115, such as, e.g., a number of electronic activities within a predetermined period of time (e.g., one hour, one day, one week, one month, or other suitable time period), a frequency of electronic activities, an average value associated with the electronic activity data entries in a predetermined period of time, a sum of values associated with the electronic activity data entries in a predetermined period of time, a total sum (such as, e.g., a balance) of values associated with the electronic activity data entries in a predetermined period of time, or other electronic activity-related attribute or any combination thereof. In some embodiments, the profile state may be a combination of user profile attributes and/or electronic activity-related attributes.

For example, in some embodiments, the user profile 114 is associated with a financial account of the user. The profile state for the financial account may include a financial account balance, credit limit, balance as a proportion or percentage of the credit limit, frequency of transactions, recent spending totals and/or frequency, among other transaction-related attributes.

In some embodiments, the profile state may be used with the profile criterion/criteria 116 to determine a content processing parameter defining whether the electronic message 107 is blocked and/or whether the content or portions of the content of the electronic message 107 is block. To do so, the content processing system 110 may include computer engines including, e.g., a message restriction engine 130, which may include dedicated and/or shared software components, hardware components, or a combination thereof. For example, the message restriction engine 130 may include a dedicated processor and storage. However, in some embodiments, the message restriction engine 130 may share hardware resources, including the processor 111 and storage 112 of the content processing system 110 via, e.g., a bus 113.

In some embodiments, the profile state may include one or more user defined, predefined or automatically generated profile state objectives relative to one or more types of electronic activities, such as, e.g., an objective for decreasing the frequency of electronic activities of one or more types, increasing the frequency of electronic activities of one or more types, achieving a predetermined number of electronic activities of one or more types, limiting to a predetermined number of electronic activities of one or more types, achieving a predetermined average value of electronic activities of one or more types, limiting to a predetermined average value of electronic activities of one or more types, achieving a predetermined total value of electronic activities of one or more types, limiting to a predetermined total value of electronic activities of one or more types, or other objective or any combination thereof.

In some embodiments, the profile state, including the metric or metrics associated with the user profile 114 and the profile state objectives, may be stored and updated in the user profile 114. In some embodiments, the user profile 114 may be continuously updated with the profile state as electronic activities are received, and/or may update the profile state with batches of electronic activities on periodic intervals. In some embodiments, the metric or metrics of the user profile 114 may be updated only upon access by a component of the content processing system 110, such as, e.g., by the account management service 120 and/or the message restriction engine 130.

In some embodiments, the message restriction engine 130 may access the profile criterion or criteria 116 to determine parameters for processing content in the electronic message 107. In some embodiments, based on the profile state objective(s), the message restriction engine 130 may determine the application of the profile criterion/criteria 116. For example, to achieve a profile state objective including attaining or limiting a total value of electronic activities relative to threshold value, the message restriction engine 130 may compare a metric of the profile state including a current total value to a threshold value associated with the profile state objective, such as, e.g., a goal financial balance (e.g., savings goal, credit balance goal, spending goal, etc.) or other suitable value. Thus, the message restriction engine 130 may determine the profile criterion/criteria 116, such as a threshold total value for triggering a message restriction to block or otherwise process electronic messages having a content or content type that impedes the user achieving the profile state goal. In another example, for a profile state objective including increasing or reducing electronic activities and/or values associated therewith, the message restriction engine 130 may determine a profile criterion including an incremental increase or decrease in a frequency, total number and/or total value associated with electronic activities based on the profile state. In some embodiments, the increment of the incremental increase or decrease may be a predefined value, such as, e.g., one percent, five percent, 10 percent, or other suitable increment, or may be based off of learned parameters, e.g., using a machine learning model.

In some embodiments, the message restriction engine 130 may use one or more machine learning models to determine the profile criterion based on the profile state and profile state objective. In some embodiments, the one or more machine learning models may include supervised learning, such as a regression model to generate a likeliness score (percent) for achieving the user's profile state objective, whether that's save 10% more etc. based on inputs of the number/vectorized content of the one or more types of emails (as determined by the message content recognition model 242) and the output of the user's past changes to profile state. In some embodiments, the supervised learning model may include data from the user's past behavior, behavior of similar users, or any combination thereof. In some embodiments, examples of supervised learning models for the message restriction engine 130 may include, e.g., a logistic regression model alongside the message content recognition model 242 including, e.g., a word embedding model such as Word2Vec, Fasttext, or Glove to vectorize the content of the electronic messages.

In some embodiments, the message restriction engine 130 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the message restriction engine 130 uses the profile criteria to determine whether the profile state meets the profile criteria. Where the profile state meets the profile criteria, the message restriction engine 130 may trigger content filtering according to one or more content processing parameter(s). For example, where the profile state meets or exceeds a threshold value determined according to the profile objectives, the message restriction engine 130 may trigger the content processing parameter(s) for use in content filtering.

In some embodiments, the content processing parameter(s) may include a specification of message attributes that are associated with achieving or impeding a profile state object, such as, e.g., content type, sender type, specific content, specific sender, or any other suitable parameter for filtering electronic messages or any combination thereof. In some embodiments, the content processing parameter(s) may be based on the profile criteria that triggers the filtering. In particular, the message restriction engine 130 may determine a content, content type, sender and/or sender type to block based on the profile criteria, the metric, the profile state objective or any combination thereof. For example, the profile state exceeding a profile criteria for electronic activity frequency for electronic activities of a particular type may be used by the message restriction engine 130 to determine that electronic messages related to the electronic activity. Thus, content and/or senders related to the particular type of electronic activities may be used as a content processing parameter to define whether to block the electronic message 107.

In some embodiments, to use the content processing parameter(s) to determine whether or not to block the electronic message 107, the content processing system 110 may include computer engines including, e.g., a content processing model engine 140 to compare the content and/or metadata of the electronic message 107 to the content processing parameter(s). In some embodiments, the content processing model engine 140 may include dedicated and/or shared software components, hardware components, or a combination thereof. For example, the content processing model engine 140 may include a dedicated processor and storage. However, in some embodiments, the content processing model engine 140 may share hardware resources, including the processor 111 and storage 112 of the content processing system 110 via, e.g., a bus 113.

In some embodiments, the content processing model engine 140 may ingest the content and/or metadata of the electronic message 107 to recognize message attributes including content, content type, sender and/or sender type for the electronic message. The recognized message attributes may then be matched to the content processing parameter(s) to determine whether the electronic message 107 matches the content processing parameter(s) such that the electronic message 107 and/or content thereof is to be blocked from the electronic messaging client 103.

In some embodiments, to recognize the message attributes, the content processing model engine 140 may use the content and/or metadata of the electronic message 107 as input to a content recognition model. In some embodiments, the content recognition model may recognize the content (e.g., text, images, media, etc.) and classify the electronic message 107 according to the content, such as based on a recognition of text in the electronic message 107.

In some embodiments, the content processing model engine 140 may be configured to utilize one or more exemplary AI/machine learning techniques for natural language recognition/understanding, such as machine learning techniques for morphological analysis, syntactic analysis, lexical semantic analysis, relational semantic analysis, discourse semantic analysis, or other suitable techniques for natural language understanding tasks or any combination thereof. In some embodiments, the machine learning techniques may include one or more models for statistical natural language processing including, e.g., decision trees, hidden Markov models, cache language models, or other suitable models for ingesting features generated from the electronic message 107 content and/or metadata and making soft, probabilistic decisions based on attaching real-valued weights to each feature, or any suitable combination thereof. In some embodiments, the machine learning techniques may include one or more models for neural network models for natural language processing including, e.g., sequence-to-sequence, convolution neural networks (CNN), radial basis function network, or other suitable neural network or any combination thereof.

Alternative, or in addition, the content processing model engine 140 may employ content and/or formatting templates to identify the content and/or content type of the electronic message 107. For example, in some embodiments, contents associated with the electronic messages related to the profile objective may have a known format or set of formats for content layout that may be correlated to a particular source or subject. In some embodiments, the term "format" in relation to content refers to the arrangement of and style of elements for representation to a user on the user device 102. Thus, the content processing model engine 140 may compare the formatting of the electronic message 107 to format templates to identify a likely source and/or subject to which the electronic message 107 relates. Similarly, in some embodiments, content of a particular subject and/or type may often conform to common terms, phrases, images, etc. Thus, the content processing model engine 140 may compare the content of the electronic message 107 to content templates to identify a likely source and/or subject to which the electronic message 107 relates.

In some embodiments, the content processing model engine 140 may use machine learning-based content recognition and content and/or format templates to determine whether a content of the electronic message 107 matches the content processing parameter(s). In some embodiments, the content processing model engine 140 may compare a sender identified in the metadata of the electronic message 107 to a library of senders associated with content, content types, content processing parameter(s), or other attribute. Based on a matching of the sender to the content, content type, sender and/or sender type of the content processing parameter(s), the content processing model enginge 140 may determine to block the electronic message 107.

In some embodiments, where the content, format and/or metadata match the content processing parameter(s), the content processing system 110 may establish a processed content 108 that blocks the electronic message 107. In some embodiments, the processed content 108 may be sent to the electronic messaging client 103 to block the electronic message 107 at the user device 102. Alternatively, the content processing system 110 may prevent the electronic message 107 from being delivered to the user device 102 prior to receipt, e.g., by intercepting the electronic message 107.

Figure 2:
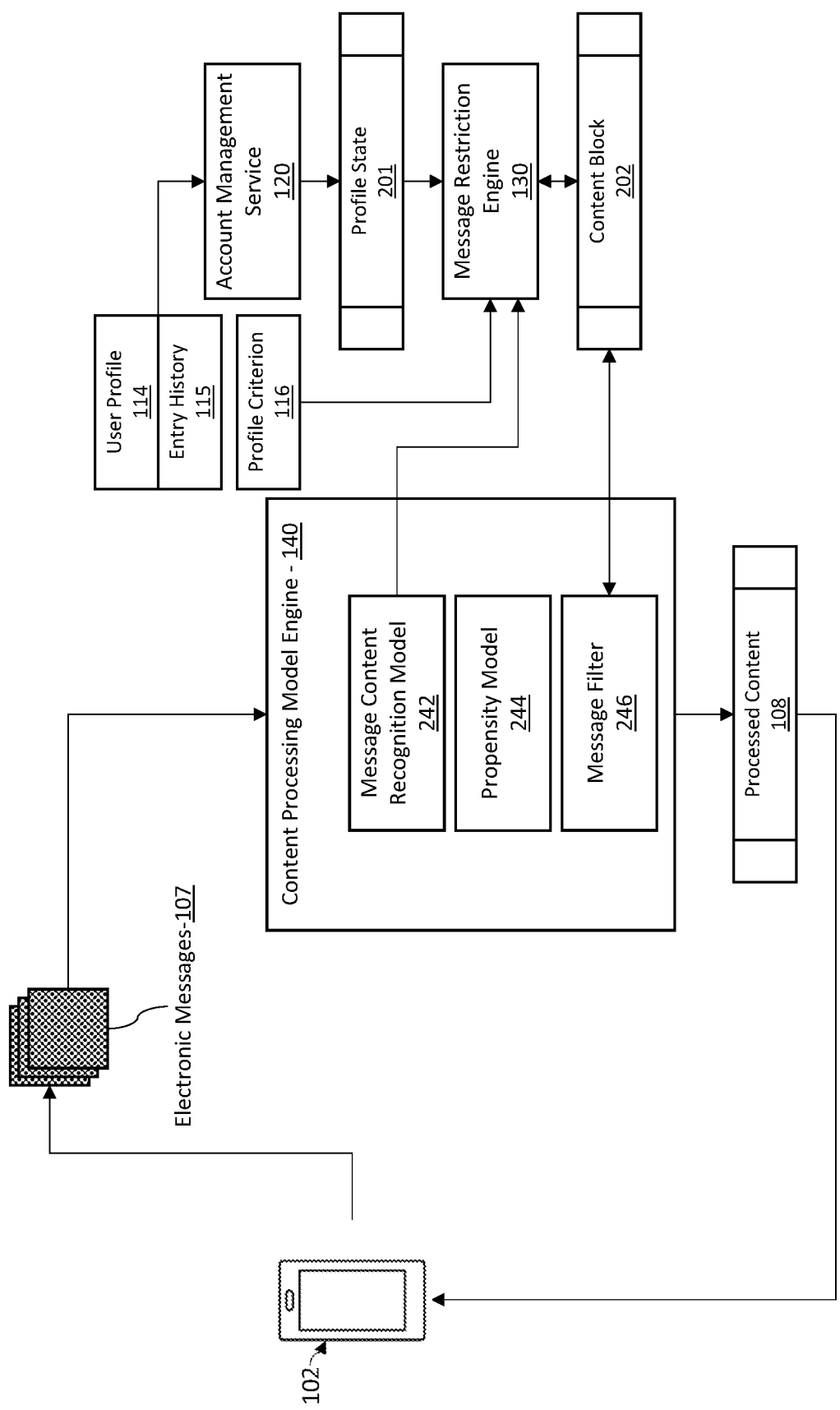

FIG. 2 illustrates a flowchart of an illustrative methodology of filtering electronic messages and/or electronic message content of an electronic messaging client in accordance with one or more embodiments of the present disclosure.

In some embodiments, in response to the electronic message 107, the account management service 120 may access the user profile 114 and/or the entry history 115 to determine a profile state 201 of the user associated with the electronic message 107. In some embodiments, the profile state 201 may include, e.g., a user location as specified in the user profile 114, a user preference as specified in the user profile 114, or other profile attribute indicated in the user profile 114. In some embodiments, the profile state 201 may include electronic activity-related attribute based on the electronic activity data entries recorded in the entry history 115, such as, e.g., a number of electronic activities within a predetermined period of time (e.g., one hour, one day, one week, one month, or other suitable time period), a frequency of electronic activities, an average value associated with the electronic activity data entries in a predetermined period of time, a sum of values associated with the electronic activity data entries in a predetermined period of time, a total sum (such as, e.g., a balance) of values associated with the electronic activity data entries in a predetermined period of time, or other electronic activity-related attribute or any combination thereof. In some embodiments, the profile state 201 may be a combination of user profile attributes and/or electronic activity-related attributes.

For example, in some embodiments, the user profile 114 is associated with a financial account of the user. The profile state 201 for the financial account may include a financial account balance, credit limit, balance as a proportion or percentage of the credit limit, frequency of transactions, recent spending totals and/or frequency, among other transaction-related attributes.

In some embodiments, the profile state 201 may be used with the profile criterion/criteria 116 to determine a content block 202 defining whether the electronic message 107 is blocked and/or whether the content or portions of the content of the electronic message 107 is block. To do so, the message restriction engine 130, may receive the profile criterion/criteria 116 associated with the user profile 114 to determine a profile criterion or criteria associated with the electronic message 107.

In some embodiments, the exemplary profile criterion(ia) 116 may include one or more user defined, predefined or automatically generated profile state 201 objectives relative to one or more types of electronic activities, such as, e.g., an objective for decreasing the frequency of electronic activities of one or more types, increasing the frequency of electronic activities of one or more types, achieving a predetermined number of electronic activities of one or more types, limiting to a predetermined number of electronic activities of one or more types, achieving a predetermined average value of electronic activities of one or more types, limiting to a predetermined average value of electronic activities of one or more types, achieving a predetermined total value of electronic activities of one or more types, limiting to a predetermined total value of electronic activities of one or more types, or other objective or any combination thereof.

For example, in some embodiments, the profile criterion (ia) 116 may include, e.g., a savings goal, a balance level, a credit limit, a transaction volume, a transaction frequency, a budget for a predetermined or indefinite period of time, and/or other suitable goal. Similar profile criterion/criteria 116 may be defined for, e.g., social media activities, video game activities, or other electronic activities.

In some embodiments, the message restriction engine 130 may ingest profile criterion/criteria 116 based on the objective(s) for the profile state 201. For example, to achieve or limit a total value of electronic activities relative to predetermined value, an objective may include a value associated with the profile state 201 objective and/or a different between the value and a current total value of the profile state 201, such as, e.g., a goal financial balance (e.g., savings goal, credit balance goal, spending goal, etc.) or other suitable value. In another example, for a profile state 201 objective including increasing or reducing electronic activities and/or values associated therewith, and as a result the profile criterion 116 include an incremental increase or decrease in a frequency, total number and/or total value associated with electronic activities based on the profile state 201. In some embodiments, the increment of the incremental increase or decrease may be a predefined value, such as, e.g., one percent, five percent, 10 percent, or other suitable increment.

In some embodiments, the message restriction engine 130 may be configured to utilize one or more exemplary AI/machine learning techniques chosen from, but not limited to, decision trees, boosting, support-vector machines, neural networks, nearest neighbor algorithms, Naive Bayes, bagging, random forests, and the like in order to produce content block 202 for filtering electronic messages 107 according to the profile criterion 116. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments, the message restriction engine 130 may use one or more machine learning models to determine the content block 202 based on the profile state 201, the profile criterion 116 and content of the electronic messages 107, e.g., as recognized by the message content recognition model 242. In some embodiments, the one or more machine learning models may include supervised learning, such as a regression model to generate a likeliness score (percent) for achieving the user's profile state objective, whether that's save 10% more etc. based on inputs of the number/vectorized content of the one or more types of emails (as determined by the message content recognition model 242) and the output of the user's past changes to profile state. In some embodiments, the supervised learning model may include data from the user's past behavior, behavior of similar users, or any combination thereof. In some embodiments, examples of supervised learning models for the message restriction engine 130 may include, e.g., a logistic regression model alongside the message content recognition model 242 including, e.g., a word embedding model such as Word2Vec, Fasttext, or Glove to vectorize the content of the electronic messages.

In some embodiments, the message restriction engine 130 may employ a reinforcement learning approach. Thus, in some embodiments, the message restriction engine 130 may make the simplifying assumption to model user behavior as a Markov Decision Process where the model receives positive input when an electronic activity conforms to the profile objectives in response to message filtering according to the content block 202, or negative rewards when an electronic activity is counter to the profile objectives in response to message filtering according to the content block 202. In some embodiments, the message restriction engine 130 may then be trained on the "environment" by filtering more or less emails for users and returning to the model user electronic activities in response to the changes to the filtering.

In some embodiments, the message restriction engine 130 uses the profile criteria to determine whether the profile state 201 meets the profile criterion 116 and whether a content block is likely to improve the profile state 201 relative to the profile criterion 116. Where the content block 202 is likely to cause the profile state 201 to meet the profile criterion 116, the message restriction engine 130 may trigger content filtering by a message filter 246. For example, where the profile state 201 meets or exceeds a threshold value determined according to the profile objectives, the message restriction engine 130 may trigger the content block 202 for use in content filtering.

In some embodiments, the content block 202 may include a specification for, e.g., content type, sender type, specific content, specific sender, or any other suitable parameter for filtering electronic messages or any combination thereof. In some embodiments, the content block 202 may be based on the profile criteria that triggers the filtering. In particular, the message restriction engine 130 may determine a content, content type, sender and/or sender type to block based on the profile criteria. For example, the profile state 201 exceeding a profile criteria for electronic activity frequency for electronic activities of a particular type may be used by the message restriction engine 130 to determine that electronic messages related to the electronic activity. Thus, content and/or senders related to the particular type of electronic activities may be used as a content block 202 to define whether to block the electronic message 107.

In some embodiments, the message restriction engine 130 may use word vectorizations or other content recognition as an input to determine the content block 202 and likelihood of achieving the profile criterion 116. Accordingly, the content processing model engine 140 may include a message content recognition model 242 to generate the word vectorizations for the message restriction engine 130 to determine the content block 202 and determine whether or not to block the electronic message 107.

In some embodiments, the message content recognition model 242 may ingest the content and/or metadata of the electronic message 107 to recognize message attributes including content, content type, sender and/or sender type for the electronic message. The recognized message attributes may then be matched to the content block 202 to determine whether the electronic message 107 matches the content block 202 such that the electronic message 107 and/or content thereof is to be blocked from the electronic messaging client 103.

In some embodiments, to recognize the message attributes, the message content recognition model 242 may use the content and/or metadata of the electronic message 107. In some embodiments, the message content recognition model 242 may recognize the content (e.g., text, images, media, etc.) and classify the electronic message 107 according to the content, such as based on a recognition of text in the electronic message 107.

In some embodiments, the message content recognition model 242 may be configured to utilize one or more exemplary AI/machine learning techniques for natural language recognition/understanding, such as machine learning techniques for morphological analysis, syntactic analysis, lexical semantic analysis, relational semantic analysis, discourse semantic analysis, or other suitable techniques for natural language understanding tasks or any combination thereof. In some embodiments, the machine learning techniques may include one or more models for statistical natural language processing including, e.g., decision trees, hidden Markov models, cache language models, or other suitable models for ingesting features generated from the electronic message 107 content and/or metadata and making soft, probabilistic decisions based on attaching real-valued weights to each feature, or any suitable combination thereof. In some embodiments, the machine learning techniques may include one or more models for neural network models for natural language processing including, e.g., sequence-to-sequence, convolution neural networks (CNN), radial basis function network, or other suitable neural network or any combination thereof. In some embodiments, the message content recognition model 242 may process content to produce vectorizations via word embeddings for input into the message restriction engine 130, such as, a word embedding model such as Word2Vec, Fasttext, or Glove to vectorize the inputs Alternative, or in addition, the message content recognition model 242 may employ content and/or formatting templates to identify the content and/or content type of the electronic message 107. For example, in some embodiments, contents associated with the electronic messages related to the profile objective may have a known format or set of formats for content layout that may be correlated to a particular source or subject. In some embodiments, the term "format" in relation to content refers to the arrangement of and style of elements for representation to a user on the user device 102. Thus, the message content recognition model 242 may compare the formatting of the electronic message 107 to format templates to identify a likely source and/or subject to which the electronic message 107 relates. Similarly, in some embodiments, content of a particular subject and/or type may often conform to common terms, phrases, images, etc. Thus, the message content recognition model 242 may compare the content of the electronic message 107 to content templates to identify a likely source and/or subject to which the electronic message 107 relates.

In some embodiments, the message content recognition model 242 may use machine learning-based content recognition and content and/or format templates to determine whether a content of the electronic message 107 matches the content block 202(s). In some embodiments, the content processing model engine 140 may compare a sender identified in the metadata of the electronic message 107 to a library of senders associated with content, content types, content block 202, or other attribute. In some embodiments, the message content recognition model 242 may employ, e.g., a word embedding model such as Word2Vec, Fasttext, or Glove to vectorize the content of the electronic messages.

In some embodiments, while the electronic message 107 may include content that matches the type related to the content block 202, the electronic message 107 may nevertheless be unlikely to entice the user into a user behavior that is contrary to the profile objective and the profile criteria. For example, an email may include a discount offer on a product when the user has set a profile objective to reduce spending or maintain a balance below a selected balance. The discount offer may be recognized by the message content recognition model 242 as content related to content processing parameter(s) for effectuating the reduction of spending or maintaining the budget, but the discount offer may be for an item that the user is unlikely to purchase regardless of the discount. Accordingly, the content processing model engine 140 may include a propensity model 244 to determine whether content matching the content block 202 is likely or unlikely to entice the user into a behavior contrary to the profile objective and/or profile criteria. For example, the propensity model 244 employ, e.g., unsupervised clustering, such as, e.g., K-means and/or mean shift clustering or other suitable unsupervised clustering model or any combination thereof.

In some embodiments, the propensity model 244 may include a predictive model for correlating user behaviors to one or more situations. For example, in the case of transactions, a user may perform more purchases for clothing from one brand as opposed to clothing from another brand. Similarly, a user may be more likely to post on one social network as opposed to another social network. Similarly, a user may perform transactions with a particular brand soon after receiving electronic messages from the particular brand, or may post on a particular social network soon after receiving an electronic message from the particular social network. Therefore, user behavior can be correlated with senders, contents, content types, brands, social networks, websites, publications, or any other suitable attribute of a target of the user's behavior.

Accordingly, in some embodiments, the propensity model 244 may include a machine learning model for predicting a likelihood of a user to engage with the content of the electronic message 107 based on the content type, the sender, or other metadata. In some embodiments, the propensity model 244 may ingest historical electronic messages associated with the user and predict a propensity to engage. The predicted propensity to engage may then be compared against electronic activity data entries in the entry history 115 to determine whether the user did in engage with the content by performing an electronic activity with a matching entity and/or matching content that matches between one or more electronic activity data entries and each historical electronic message. In some embodiments, the electronic activity data entry(ies) may be deemed to match a historical electronic message where the electronic activity data entry (ies) have a date and time within, e.g., five minutes, ten minutes, fifteen minutes, twenty minutes, thirty minutes, one hour, two hours, three hours, four hours, six hours, twelve hours, one day or other suitable period. In some embodiments, based on a difference between the predicted propensity to engage for with the content and/or content type and/or sender and/or sender type of each historical electronic message and how often the user did engage according to the electronic activity data entry(ies), the propensity model 244 may be trained to predict for the user a propensity to engage based on the electronic message 107.

In some embodiments, based on a matching of the sender to the content, content type, sender and/or sender type of the content block 202, and the propensity model 244 predicting a propensity of the electronic message 107 to elicit a user behavior that exceeds a predetermined threshold, e.g., 50%, 60%, 70%, 75%, 80%, 85%, 90%, 95%, 97%, 99%, 99.5%, or other suitable threshold, the content processing model engine 140 may instruct a message filter 246 to block the electronic message 107.

In some embodiments, where the content, format and/or metadata match the content block 202, the content processing system 110 may establish a processed content 108 that blocks the electronic message 107. In some embodiments, the processed content 108 may be sent to the electronic messaging client 103 to block the electronic message 107 at the user device 102. Alternatively, the content processing system 110 may prevent the electronic message 107 from being delivered to the user device 102 prior to receipt, e.g., by intercepting the electronic message 107.

In some embodiments, the message filter 246 may filter the content of the electronic message 107 by generating an overlay over the electronic message 107 content that obscures the content matching the content block 202.

In some embodiments, the message filter 246 may use message elements, such as HTML element or other document format elements to identify selectable content, such as one-click purchases, hyperlinks, hyperlinks to sale, social media posting buttons, or other selectable elements. Such selectable elements may be removed, blocked or otherwise rendered inoperable.

In some embodiments, some electronic messages may include selectively viewable content according to a selectable content format inserted by a sender. The selectively viewable content switches in its display to the user based on the identity of the user or other user attribute. The message filter 246 may identify the selectively viewable content and remove or otherwise block the ones that match the content block 202. Alternatively, or in addition, the message filter 246 may obfuscate the user attribute that triggers the matching content of the selectively viewable content to prevent the electronic message 107 from selecting and presenting the matching content. Alternatively, or in addition, the message filter 246 may intervene with the selectively viewable content on the user's behalf to trigger the non-matching content of the selectively viewable content to prevent the electronic message 107 from selecting and presenting the matching content.

Figure 3:
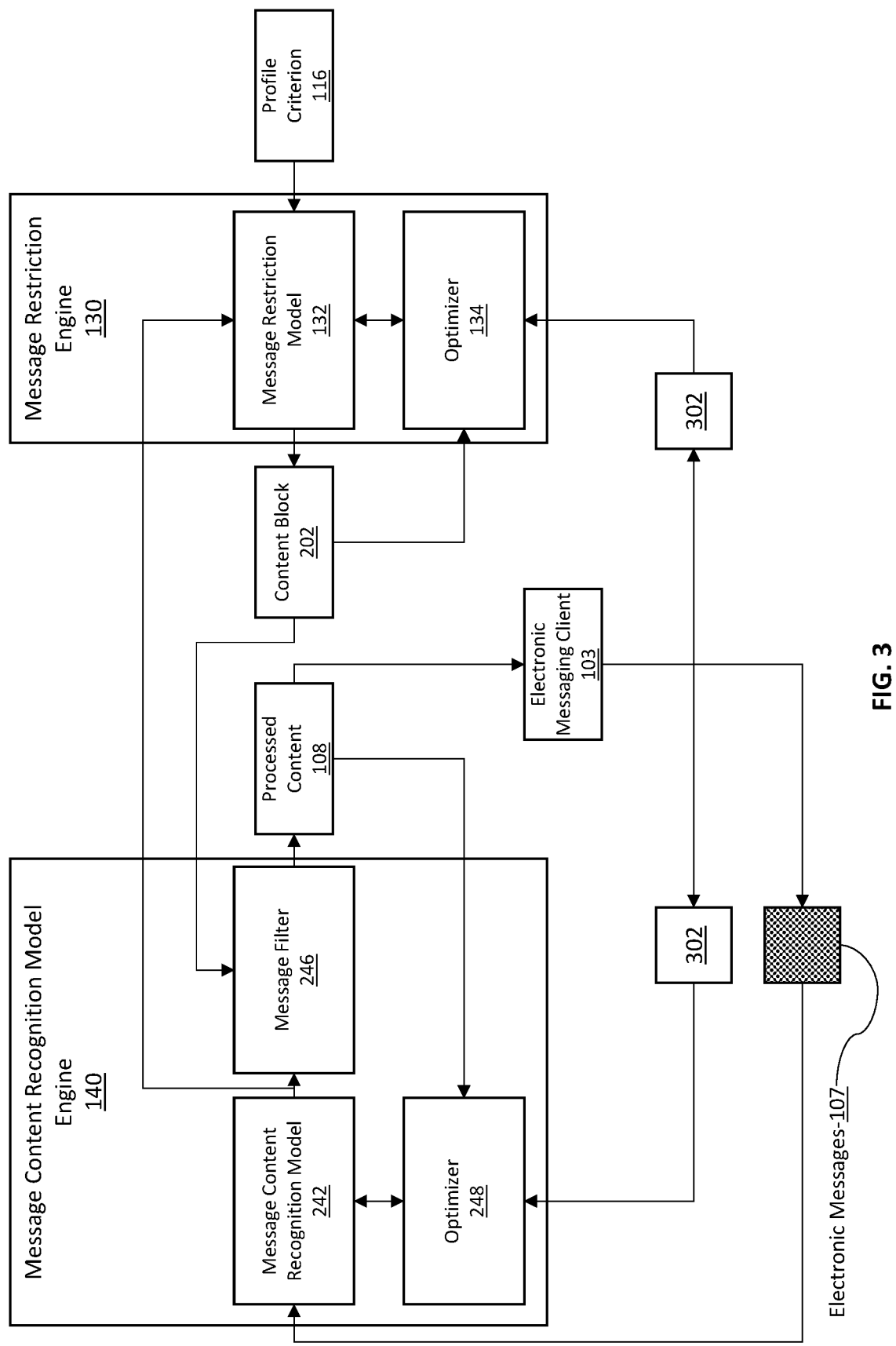

FIG. 3 illustrates a flowchart of an illustrative methodology of training and using the message restriction engine 130 and content processing model engine 140 of the content processing system to filter content in the electronic messaging client 103 in accordance with one or more embodiments of the present disclosure.

In some embodiments, the message restriction engine 130 may utilize a message restriction model 132 to predict a content block 202 for one or more electronic messages 107 based on profile criterion/criteria 116 and content recognized by a message content recognition model 242. Accordingly, the message restriction model 132 may perform feature engineering with a feature generator (not shown), predict the content block 202 with at least one message restriction model 132, and train the at least one message restriction model 132 with an optimizer 134 based on training data 302.

In some embodiments, the feature generator ingests the profile criterion/criteria 116 and encodes the profile criterion/criteria 116 into a vector representation. In some embodiments, the message restriction model 132 ingests the feature vector and, e.g., word embeddings produced by the message content recognition model 242 for content of an electronic message 107, and produces a prediction of a content block 202. In some embodiments, to produce this prediction, the message restriction model 132 may include a machine learning model including a classification model, such as, e.g., a recurrent neural network (RNN), a convolutional neural network (CNN), linear regression, or any other suitable algorithm for a regression model.

In some embodiments, for computational efficiency while preserving accuracy of predictions, the message restriction model 132 may advantageously include a clustering model, such as, e.g., connectivity models, centroid models (e.g., K-Means clustering, K-Nearest neighbors, etc.), distribution models (e.g., expectation maximization, etc.), density models (e.g., DBSCAN, OPTICS, etc.), and combinations thereof, including hierarchical clustering. In some embodiments, the use of clustering may be employed to form a self-organizing map of the profile criterion/criteria 116, enabling unsupervised learning that dynamically adjusts to the groupings of the profile criteria clustered according to content processing parameter(s). However, other forms of classifier models may be employed as described above for supervised, unsupervised and/or semi-supervised learning techniques.

Accordingly, the message restriction model 132 ingests a feature vector(s) and processes the features encoded therein using the message restriction model 132 to produce a model output vector. In some embodiments, the model output vector may be utilized to generate a label including the content block 202. For example, in some embodiments, the model output vector may include a probability value indicating a probability that implementing a content block on the content of the electronic message 107 will improve the profile state relative to the profile criterion 116. The message restriction engine 130 may produce the content block 202 where the probability value exceeds a predetermined probability threshold, such as, e.g., 0.5, 0.6, 0.7, 0.8, 0.9, 0.95, 0.99, or other suitable probability threshold value.

In some embodiments, the content processing model engine 140 may utilize a message content recognition model 242 to produce content vectors for use by the message restriction model 132. In some embodiments, the message content recognition model 242 may include word vectorizations, phrase vectorizations, sequence vectorizations, document vectorizations, or other suitable semantic or non-semantic vectorization of message content. In some embodiments, a message filter 246 may employ the content and/or content vectorizations as well as the content block 202 form the message restriction to produce processed content 108. In some embodiments, the content processing model engine 140 may perform feature engineering, e.g., with a feature generator (not shown), to generate feature vectors that encode each of the filter criteria and the content of the electronic message 107.

In some embodiments, the content processing model engine 140 may employ any suitable technique for feature selection and feature extraction. For example, the feature generator may employ, e.g., Bag-of-Words, filtering by word frequency, filtering stop words, stemming of words, and other techniques for selecting and extracting features representative of the content. The selected and extracted features may then be embedded into one or more feature vectors, using a suitable embedding technique, such as, e.g., Latent Semantic Analysis, Neural Network embedded (e.g., Word2Vec, Doc2Vec, etc.) or any other suitable technique to create the feature vector(s). In some embodiments, the message content recognition model 242 ingests the feature vector(s) and produces a prediction of semantic labels and/or vectorizations indicating concepts of the content or portions of content of the electronic message 107 of the feature vector.

For example, the message content recognition model 242 may be configured to provide content recognition for content or portions of content of the electronic message that indicate concepts including, e.g., product or service discounts, deals, subscription offers, coupons, finance rates, and other financial and/or transactional deals for the content block 202 pertaining to user financial profile objectives. In another example, the message content recognition model 242 may be configured to provide content recognition for content or portions of content of the electronic message that indicate concepts including, e.g., social media reminders, social media activity updates, social media promotions, or other social media related concepts for the content block 202 pertaining to user social media profile objectives.

In some embodiments, the semantic labels and/or vectorizations as well as the content block 202 are provided to the message filter 246. The message filter 246 may compare the semantic labels of the content and/or each content portion to the electronic message 107. Based on the semantic labels, the message filter 246 may then produce a processed content 108 configured to prevent the content and/or portions of the content of the electronic message 107 from being presented.

In some embodiments, the processed content 108 may be provided to the user device 102, e.g., to prevent the presentation of the electronic message 107, as described above with reference to FIG. 1 and/or FIG. 2. In some embodiments, the processed content 108 may trigger the user device 102 to generate and display the electronic messaging client 103 with an indication that content is being blocked based on the processed content 108. In some embodiments, the indication may include, e.g., an alert signifying the electronic message 107, a description or label (e.g., produced by the message content recognition model 242) for the content of the electronic message 107, a description and/or label of the content block 202, among other information to inform the user regarding the blocked content. In some embodiments, the electronic messaging client 103 may include one or more interface elements to modify, confirm or deny the processed content 108. For example, the user may input a training data 302 with an option to confirm the processed content 108 as correct or deny the processed content 108 as incorrect or adjust attributes to correct the processed content 108 (e.g., what content of the electronic message 107 is being filtered, what content processing parameter(s) are applicable, etc.).

In some embodiments, the training data 302 may include a user selection of a confirm option or a deny option relative to the processed content 108.

In some embodiments, the training data 302 may also include a lack of a selection. For example, the user may choose to ignore the alert of the electronic messaging client 103, e.g., by selecting an "ignore" element, or by not providing any selection at all. In some embodiments, where the user ignores the electronic messaging client 103, the lack of selection may be interpreted as a command to not take action for the processed content 108, thus signaling a confirmation of the processed content 108. Accordingly, the training data 302 may include an indication of a confirmation of the processed content 108 based on the user's lack of selection.

In some embodiments, in the case of the lack of any selection, the training data 302 may be determined to be an ignore interaction after a predetermined period of time has elapsed without any user selection. For example, the optimizer 134 and/or optimizer 248 may include a timer that starts upon generation of the processed content 108 and ends upon the predetermined time period elapsing. Alternatively, or in addition, the user device 102 and/or electronic messaging client 103 may include the timer that starts upon receiving the processed content 108. In some embodiments, the predetermined period of time may include any suitable time period for user interaction with the electronic messaging client 103, such as, e.g., 15 seconds, 30 seconds, 40 seconds, 40 seconds, 45 seconds, 1 minute, 3 minutes, 5 minutes, or any other suitable time period.

In some embodiments, the training data 302 may instead or in addition be predefined or known filtering of the electronic message 107 and contents thereof. For example, in some embodiments, the electronic message 107 may include a training input for the message restriction model 132 and message content recognition model 242, and may be paired with a known content filter as training data 302. The known content filter may include an unfiltered classification, a message block to indicate a blocking of the electronic message 107, a content part block to indicate a blocking of one or more particular parts of content of the electronic message 107, or other content filter attributes. In some embodiments, upon predicting the processed content 108, the training data 302 may be fed back to each optimizer to update parameters of each model to improve prediction of the processed content 108 based on the electronic message 107 and the profile criterion/criteria 116.

In some embodiments, the message restriction model 132 may be trained based on the processed content 108 and the training data 302. Based on the difference between the processed content 108 and the training data 302, the parameters of the classification model of the message restriction model 132 may be updated to improve the accuracy of the recurring data entry classification.

In some embodiments, training is performed using the optimizer 134. In some embodiments, the processed content 108 fed back to the optimizer 134. The optimizer 134 may also ingest the training data 302. In some embodiments, the optimizer 134 may employ a loss function, such as, e.g., Hinge Loss, Multi-class SVM Loss, Cross Entropy Loss, Negative Log Likelihood, or other suitable classification loss function. The loss function determines an error based on the training data 302 and the processed content 108. In some embodiments, the optimizer 134 may, e.g., backpropagate the error to the message restriction model 132 to update the parameters using, e.g., gradient descent, heuristic, convergence or other optimization techniques and combinations thereof.

In some embodiments, the optimizer 134 may therefore train the parameters of the message restriction model 132 to infer user preferences in content processing parameter(s) based on profile states. As a result, the message restriction model 132 may be continually trained and optimized based on user feedback.

Similarly, in some embodiments, the message content recognition model 242 may include a content classification machine learning model trained based on the processed content 108 and the training data 302. Based on the difference between the processed content 108 and the training data 302, the parameters of the classification model of the message content recognition model 242 may be updated to improve the accuracy of the recurring data entry classification.

In some embodiments, training is performed using the optimizer 248. In some embodiments, the processed content 108 fed back to the optimizer 248. The optimizer 248 may also ingest the training data 302. In some embodiments, the optimizer 248 may employ a loss function, such as, e.g., Hinge Loss, Multi-class SVM Loss, Cross Entropy Loss, Negative Log Likelihood, or other suitable classification loss function. The loss function determines an error based on the training data 302 and the processed content 108. In some embodiments, the optimizer 248 may, e.g., backpropagate the error to the message content recognition model 242 to update the parameters using, e.g., gradient descent, heuristic, convergence or other optimization techniques and combinations thereof.

In some embodiments, the optimizer 248 may therefore train the parameters of the message content recognition model 242 to more accurately classify content for filtering. As a result, the message content recognition model 242 may be continually trained and optimized based on user feedback.

Figure 4:
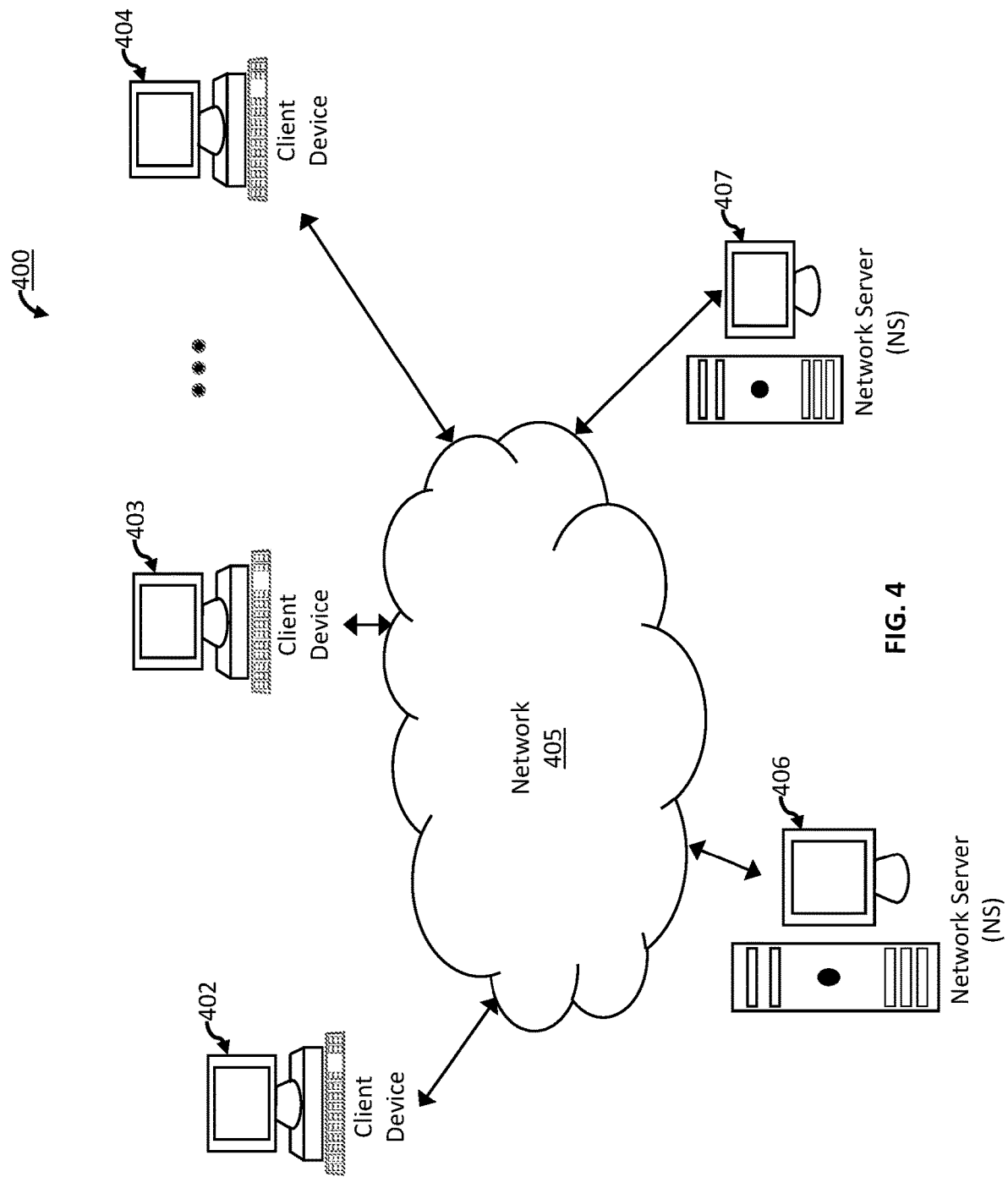

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, . Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
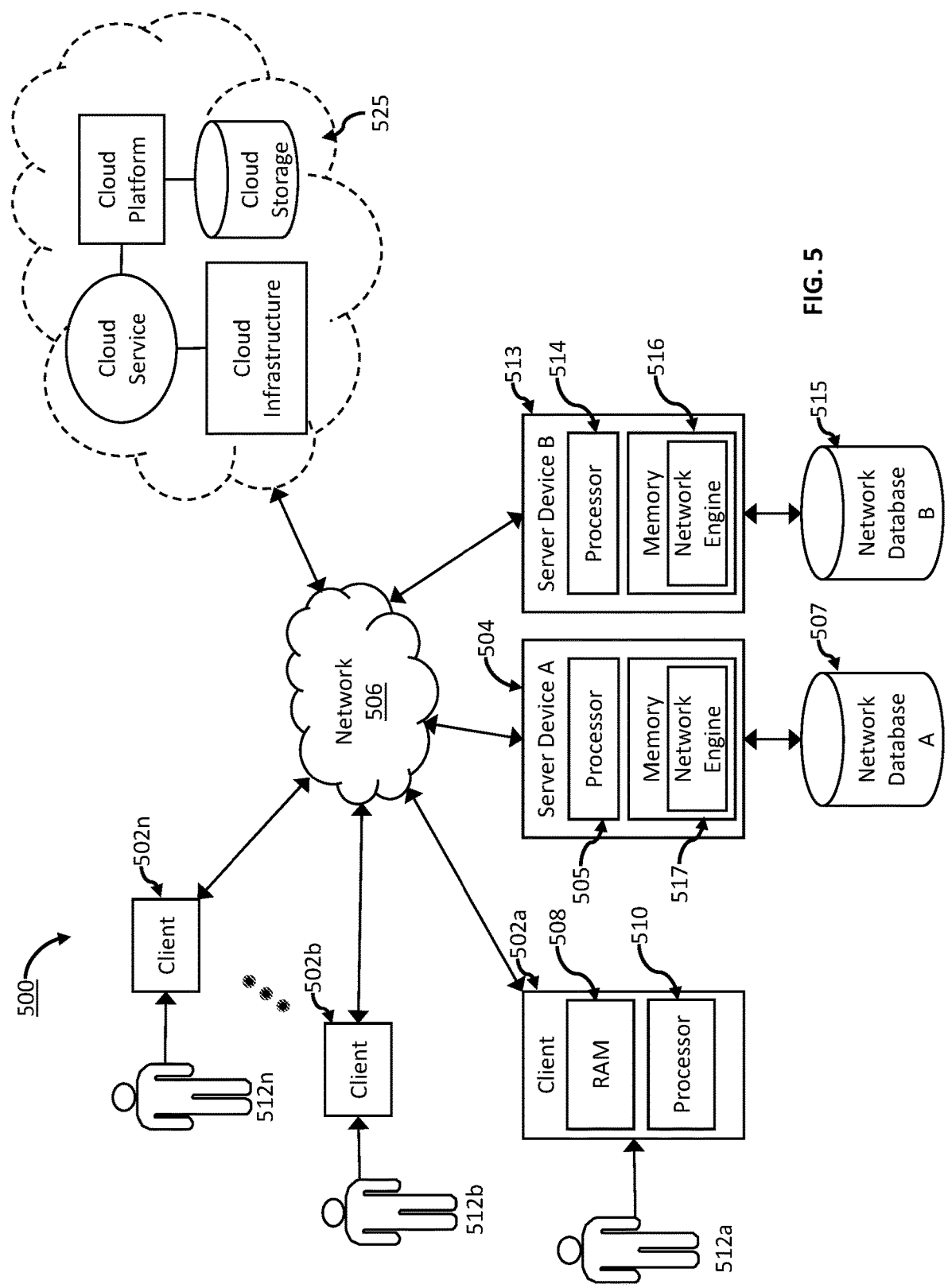

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of member computing device 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application such as Microsoft Corporation's Internet Explorer™, Apple Computer, Inc.'s Safari™, Mozilla Firefox, and/or Opera. In some embodiments, through the member computing devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
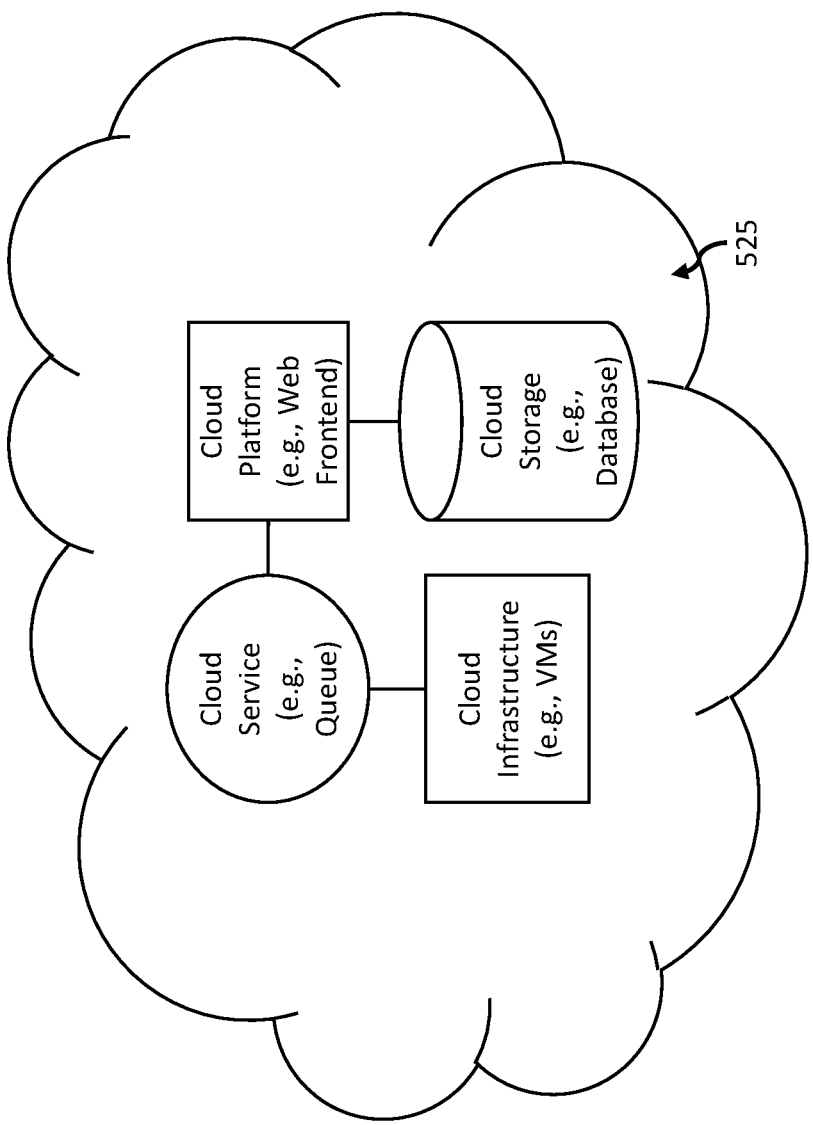
Figure 7:
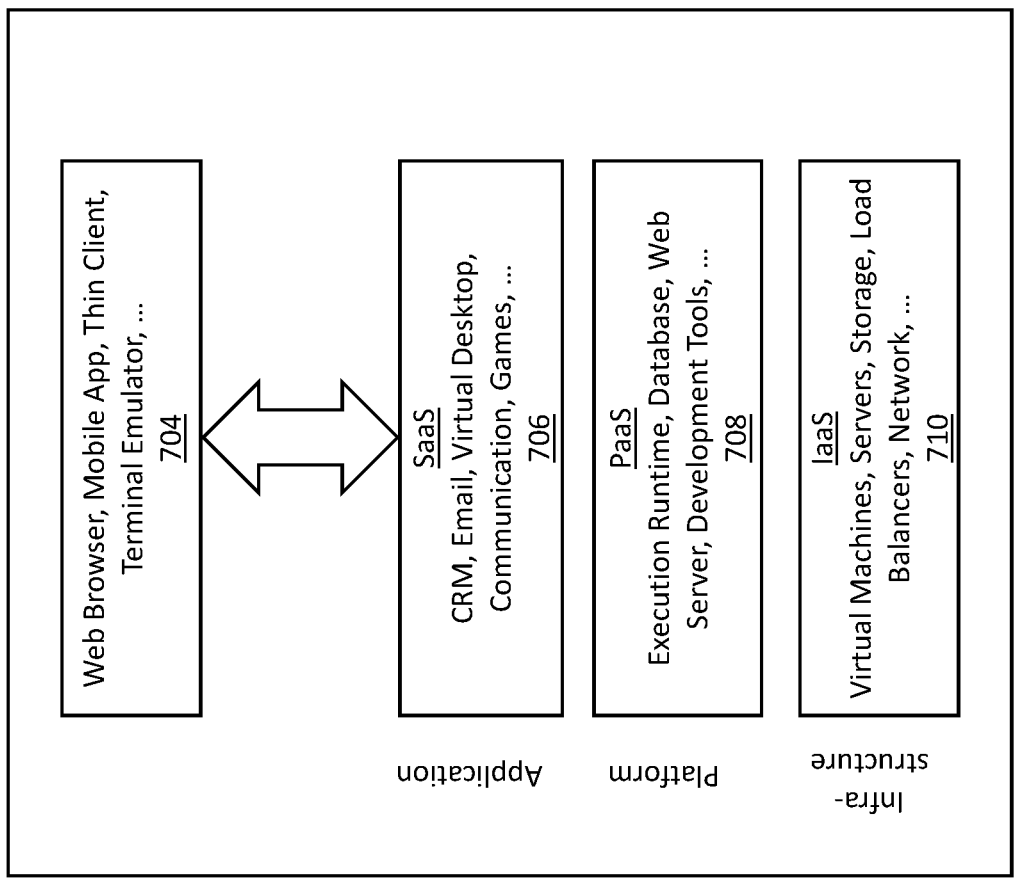

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure as a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method comprising:
   accessing, by at least one processor, a user profile associated with a user of an electronic messaging client;
   determining, by the at least one processor, a profile state of the user profile based at least in part on at least one attribute of the user profile;
      wherein the profile state comprises:
         at least one metric associated with the profile and at least one profile objective associated with the at least one metric;
   determining, by the at least one processor, at least one profile criterion associated with the user profile based at least in part on the at least one metric and the at least one profile objective;
      wherein the at least one profile criterion comprises at least one threshold value to trigger at least one filter parameter associated with the at least one profile objective;
      wherein the at least one filter parameter comprises at least one content type associated to be processed so as to facilitate achieving the at least one profile objective;
   determining, by the at least one processor, the at least one filter parameter based at least in part on the profile state surpassing the at least one profile criterion;
   utilizing, by the at least one processor, at least one content recognition model to identify a message content type of each message in a set of electronic messages received by the electronic messaging client based at least in part on content in each message in the set of electronic messages;
   determining, by the at least one processor, at least one electronic message of the set of electronic messages received by the electronic messaging client that matches the at least one content type of the at least one filter parameter based at least in part on the message content type of each message in a set of electronic messages; and
   filtering, by the at least one processor, the at least one electronic message from the electronic messages at the electronic messaging client to prevent the at least one content from being presented by the electronic messaging client so as to facilitate achieving the at least one profile objective.

2. A system comprising:
   at least one processor configured to execute software instructions to perform steps to:
      access a user profile associated with a user of an electronic messaging client;
      determine a profile state of the user profile based at least in part on at least one attribute of the user profile;
      determine at least one profile criterion associated with the user profile;
         wherein the at least one profile criterion comprises at least one threshold value to trigger at least one filter parameter;
         wherein the at least one filter parameter comprises at least one content type associated with the at least one profile criterion;
      determine the at least one filter parameter based at least in part on the profile state surpassing the at least one profile criterion;
      utilize at least one content recognition model to identify at least one electronic message of a set of electronic messages received by the electronic messaging client that matches the at least one content type of the at least one filter parameter based at least in part on message contents of the at least one electronic message; and
      filter the at least one electronic message from the electronic messages at the electronic messaging client to prevent the at least one content from being presented by the electronic messaging client.

3. The methods and/or systems as recited in any of clauses 1 and/or 2, wherein the profile state comprises a financial account balance; and
   wherein the at least one filter parameter comprises at least one restriction of the at least one content type of offers for products, services or both.

4. The methods and/or systems as recited in clause 3, further comprising:
   receiving, by the at least one processor, at least one savings goal selected by user selection;
   identifying, by the at least one processor, the at least one profile criterion based at least in part on the at least one savings goal; and
   determining, by the at least one processor, the at least one filter parameter based at least in part on the at least one profile criterion.

5. The methods and/or systems as recited in clause 4, wherein the at least one threshold value comprises at least one of:
   a savings goal,
   a balance level,
   a credit limit,
   a transaction volume,
   a transaction frequency, or
   a budget.

6. The methods and/or systems as recited in any of clauses 1 and/or 2, further comprising:
   receiving, by the at least one processor, a user profile activity history comprising at least one electronic activity performed with the user profile;
   utilizing, by the at least one processor, at least one propensity model trained to predict a propensity of the user to engage with the at least one electronic message based at least in part on the at least one content type and the user profile activity history; and
   filtering, by the at least one processor, the at least one electronic message from the electronic messages at the electronic messaging client to prevent the at least one content from being presented by the electronic messaging client based at least in part on the propensity of the user to engage with the at least one electronic message exceeding a threshold propensity value.

7. The methods and/or systems as recited in clause 6, wherein the at least one electronic activity comprises payment transactions.

8. The methods and/or systems as recited in any of clauses 1 and/or 2, further comprising generating, by the at least one processor, at least one content overlay to obscure the at least one content of the at least one electronic message to filter the at least one electronic message.

9. The methods and/or systems as recited in any of clauses 1 and/or 2, further comprising:
   identifying, by the at least one processor, a plurality of selectable content associated with the at least one content within the at least one electronic message based on a predefined selectable content format inserted by a sender; and
   determining, by the at least one processor, at least one selected content of the plurality of selectable content for presentation by the electronic messaging client based at least in part on the at least one filter parameter to filter the at least one content.

10. The methods and/or systems as recited in any of clauses 1 and/or 2, further comprising blocking, by the at least one processor, the at least one electronic message from presentation by the electronic messaging client to filter the at least one electronic message.

11. The methods and/or systems as recited in any of clauses 1 and/or 2, wherein the at least one content recognition model comprises at least one natural language processing model to recognize the at least one content based at least in part on text within the at least one electronic message.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   accessing, by at least one processor instructed by an electronic messaging client plug-in that augments functionality of a third-party electronic messaging client, a user profile associated with a user of the third-party electronic messaging client;
      wherein the third-party electronic messaging client is associated with a third-party hosted electronic messaging account associated with the user;
      wherein the third-party hosted electronic messaging account is different from the user profile;
   determining, by the at least one processor, a profile state of the user profile based at least in part on at least one attribute of the user profile;
      wherein the profile state comprises:
         at least one metric associated with the profile and
         at least one profile objective associated with the at least one metric;
   determining, by the at least one processor, at least one threshold value associated with the at least one metric associated with the user profile based at least in part on the at least one metric and the at least one profile objective;
      wherein the at least one threshold value is configured to trigger at least one filter parameter associated with the at least one profile objective in response to the at least one metric meeting, crossing or both the at least one threshold value;
      wherein the at least one filter parameter comprises at least one content type associated to be processed so as to facilitate achieving the at least one profile objective;
   utilizing, by the at least one processor, the electronic messaging client plug-in to monitor each message in a set of electronic messages received by the electronic messaging client;
   utilizing, by the at least one processor, at least one content recognition model to identify a message content type of each message in the set of electronic messages received by the electronic messaging client based at least in part on content in each message in the set of electronic messages;
   determining, by the at least one processor, at least one electronic message of the set of electronic messages received by the electronic messaging client that matches the at least one content type of the at least one filter parameter based at least in part on the message content type of each message in a set of electronic messages; and
   triggering, by the at least one processor, the electronic messaging client plug-in to filter the at least one electronic message from the electronic messages at the electronic messaging client to prevent the at least one content from being presented by the electronic messaging client so as to facilitate achieving the at least one profile objective.

2. The method of claim 1, further comprising generating, by the at least one processor, at least one content overlay to obscure the at least one content of the at least one electronic message to filter the at least one electronic message.

3. The method of claim 1, further comprising:
   identifying, by the at least one processor, a plurality of selectable content associated with the at least one content within the at least one electronic message based on a predefined selectable content format inserted by a sender; and
   determining, by the at least one processor, at least one selected content of the plurality of selectable content for presentation by the electronic messaging client based at least in part on the at least one filter parameter to filter the at least one content.

4. The method of claim 1, further comprising blocking, by the at least one processor, the at least one electronic message from presentation by the electronic messaging client to filter the at least one electronic message.

5. The method of claim 1, wherein the at least one content recognition model comprises at least one natural language processing model to recognize the at least one content based at least in part on text within the at least one electronic message.

6. The method of claim 1, further comprising:
   receiving, by the at least one processor, a user profile activity history comprising at least one electronic activity performed with the user profile;

utilizing, by the at least one processor, at least one propensity model trained to predict a propensity of the user to engage with the at least one electronic message based at least in part on the at least one content type and the user profile activity history; and filtering, by the at least one processor, the at least one electronic message from the electronic messages at the electronic messaging client to prevent the at least one content from being presented by the electronic messaging client based at least in part on the propensity of the user to engage with the at least one electronic message exceeding a threshold propensity value.

7. The method of claim 6, wherein the at least one electronic activity comprises payment transactions.

8. The method of claim 1, wherein the profile state comprises a financial account balance; and
wherein the at least one filter parameter comprises at least one restriction of the at least one content type of offers for products, services or both.

9. The method of claim 8, further comprising:
receiving, by the at least one processor, at least one savings goal selected by user selection;
identifying, by the at least one processor, the at least one threshold value based at least in part on the at least one savings goal; and
determining, by the at least one processor, the at least one filter parameter based at least in part on the at least one threshold value.

10. The method of claim 8, wherein the at least one threshold value comprises at least one of:
a savings goal,
a balance level,
a credit limit,
a transaction volume,
a transaction frequency, or
a budget.

11. A system comprising:
at least one processor configured to execute software instructions to perform steps to:
access a user profile associated with a user of a third-party electronic messaging client;
wherein the third-party electronic messaging client is augmented with an electronic messaging client plug-in that augments functionality of a third-party electronic messaging client
wherein the third-party electronic messaging client is associated with a third-party hosted electronic messaging account associated with the user;
wherein the third-party hosted electronic messaging account is different from the user profile;
determine a profile state of the user profile based at least in part on at least one attribute of the user profile;
determine at least one threshold value associated with the user profile;
wherein the at least one threshold value is configured to trigger at least one filter parameter in response to the profile state meeting, crossing or both the at least one threshold value;
wherein the at least one filter parameter comprises at least one content type associated with the at least one threshold value;
utilize the electronic messaging client plug-in to monitor each message in a set of electronic messages received by the electronic messaging client;
utilize at least one content recognition model to identify at least one electronic message of a set of electronic messages received by the electronic messaging client that matches the at least one content type of the at least one filter parameter based at least in part on message contents of the at least one electronic message; and
trigger the electronic messaging client plug-in to filter the at least one electronic message from the electronic messages at the electronic messaging client to prevent the at least one content from being presented by the electronic messaging client.

12. The system of claim 11, wherein the at least one processor is further configured to execute further software instructions to perform steps to generate at least one content overlay to obscure the at least one content of the at least one electronic message to filter the at least one electronic message.

13. The system of claim 11, wherein the at least one processor is further configured to execute further software instructions to perform steps to:
identify a plurality of selectable content associated with the at least one content within the at least one electronic message based on a predefined selectable content format inserted by a sender; and
determine at least one selected content of the plurality of selectable content for presentation by the electronic messaging client based at least in part on the at least one filter parameter to filter the at least one content.

14. The system of claim 11, wherein the at least one processor is further configured to execute further software instructions to perform steps to block the at least one electronic message from presentation by the electronic messaging client to filter the at least one electronic message.

15. The system of claim 11, wherein the at least one content recognition model comprises at least one natural language processing model to recognize the at least one content based at least in part on text within the at least one electronic message.

16. The system of claim 11, wherein the at least one processor is further configured to execute further software instructions to perform steps to:
receive a user profile activity history comprising at least one electronic activity performed with the user profile;
utilize at least one propensity model trained to predict a propensity of the user to engage with the at least one electronic message based at least in part on the at least one content type and the user profile activity history; and
filter the at least one electronic message from the electronic messages at the electronic messaging client to prevent the at least one content from being presented by the electronic messaging client based at least in part on the propensity of the user to engage with the at least one electronic message exceeding a threshold propensity value.

17. The system of claim 16, wherein the at least one electronic activity comprises payment transactions.

18. The system of claim 11, wherein the profile state comprises a financial account balance; and
wherein the at least one filter parameter comprises at least one restriction of the at least one content type of offers for products, services or both.

19. The system of claim 18, wherein the at least one processor is further configured to execute further software instructions to perform steps to:
receive at least one savings goal selected by user selection;

identify the at least one threshold value based at least in part on the at least one savings goal; and determine the at least one filter parameter based at least in part on the at least one threshold value.

20. The system of claim 18, wherein the at least one threshold value comprises at least one of:
- a savings goal,
- a balance level,
- a credit limit,
- a transaction volume,
- a transaction frequency, or
- a budget.

* * * * *